United States Patent Office 3,089,850
Patented May 14, 1963

3,089,850
PHOSPHOROTHIOLOTHIONATES DERIVED FROM GLYCOLS
Richard L. McConnell and Harry W. Coover, Jr., Kingsport, Tenn., assignors to Eastman Kodak Company, Rochester, N.Y., a corporation of New Jersey
No Drawing. Filed May 8, 1957, Ser. No. 657,727
2 Claims. (Cl. 252—32.7)

This invention relates to new organophosphorus compounds and to a method for producing these compounds.

The organophosphorus compounds within the scope of this invention are prepared by reacting a 1,2-glycol or a 1,3-glycol with phosphorus pentasulfide, $P_2S_5$. The glycols that are used for carrying out the reaction have the structural formula:

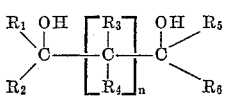

wherein $R_1$, $R_2$, $R_3$, $R_4$, $R_5$ and $R_6$ are selected from the group consisting of hydrogen and lower alkyl radicals containing 1 to 4 carbon atoms and $n$ is a number not greater than 1, i.e., either 0 or 1. In the above structural formula, the total number of carbon atoms will not ordinarily exceed 12 and the total number of carbon atoms included in $R_1$, $R_2$, $R_3$, $R_4$, $R_5$ and $R_6$ will not exceed 10. Typical examples of 1,2- and 1,3-glycols that can be used in practicing the invention are ethylene glycol, 1,3-propanediol, 2,2-dimethyl-1,3-propanediol, 2-ethyl-2-methyl-1,3-propanediol, 2,2-diethyl-1,3-propanediol, 2-butyl-2-ethyl-1,3-propanediol, 2-ethyl-1,3-hexanediol, 2,4-pentanediol, 2,2,4-trimethyl-1,3-pentanediol, 5-methyl-2,4-hexanediol, and the like.

In carrying out the process of this invention, the glycol and phosphorus pentasulfide are reacted at a temperature preferably within the range of 25 to 100° C. for a period of time within the range of 1 to 2 hours. It will be understood, however, that reaction temperatures and contact times outside of these ranges can be used without departing from the scope of the invention. The reaction is preferably carried out without a solvent, but, if desired, a solvent reaction medium can be used. Typical examples of solvents that can be employed are normally liquid hydrocarbons, for example, hexane, heptane, benzene, toluene, and the like, chlorinated hydrocarbons, as well as the ether and ester solvents.

In carrying out the reaction, the mole ratio of reactants is quite important. For example, when the mole ratio of glycol to phosphorus pentasulfide does not exceed 2:1, the product of the process is predominantly a linear organophosphorus compound. At these molar ratios, the product can contain 85 to 90% by weight of compounds having the structural formula:

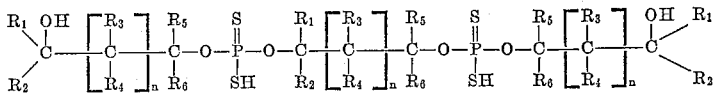

wherein $R_1$, $R_2$, $R_3$, $R_4$, $R_5$, $R_6$ and $n$ are as defined above.

When the mole ratio of glycol to phosphorus pentasulfide exceeds 2:1, for example, 3:1 or 4:1, the product of the reaction is predominantly a cyclic organophosphorus compound. Under these conditions, the product can contain 85 to 90% by weight of compounds having the structural formula:

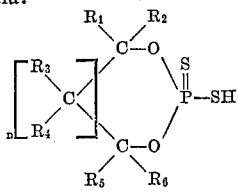

wherein $R_1$, $R_2$, $R_3$, $R_4$, $R_5$, $R_6$ and $n$ are as defined above.

By way of illustration, when 2,2-dimethyl-1,3-propanediol and phosphorus pentasulfide are reacted in a 2:1 mole ratio, as in Example 1, the product of the process is predominantly

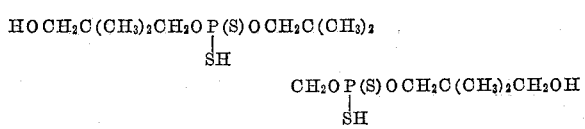

However, when 2,2-dimethyl-1,3-propanediol and phosphorus pentasulfide are reacted in a mole ratio greater than 2:1, such as in Example 2, the predominant product has the following structural formula:

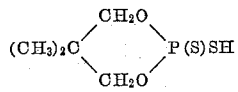

The 1,2- and 1,3-glycols appear to be rather unique in their reaction with phosphorus pentasulfide. For example, when a 1,4-glycol, such as 1,4-butanediol, is reacted with phosphorus pentasulfide, in mole ratios of 2:1 or higher, the product of the reaction is quite different from the products of this reaction as set forth above, and ordinarily they have a structural formula similar to the following:

$$(HOCH_2CH_2CH_2CH_2O)_2P(S)SH$$

The products of this invention are useful as lubricating oil additives having the property of being antioxidants. When used as lubricating oil additives, it is preferable to use the products in the form of their metal salts, preferably salts of the alkali metal and alkali earth metals as well as zinc, cadmium, copper and lead. The utility of the products of this invention as lubricating oil additives is demonstrated by the specific examples.

The following examples are illustrative of this invention:

Example 1

2,2-dimethyl-1,3-propanediol (10.4 g., 0.1 mole) and $P_2S_5$ (11.1 g., 0.05 mole) were mixed and heated on a steam bath with stirring. Hydrogen sulfide was evolved and the solids gradually melted. This reaction mixture was heated with stirring on the steam bath for 1 hour. While the reaction mixture was still warm, the viscous, transparent, oily product was decanted from a small amount of unreacted $P_2S_5$. This oily product crystallizes to a low melting, white solid after standing at room temperature for a few hours. The average molecular weight of this product was found to be 438 (ebulliometric determination in benzene). The yield was 18.9 g. of product predominantly having the formula:

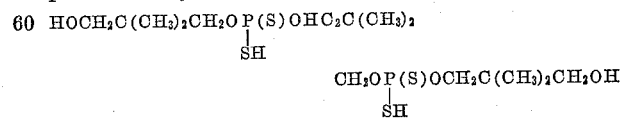

The Underwood bearing-corrosion test is one test used to evaluate the corrosion resistance of lubricating oils. In the test, 0.01% $Fe_2O_3$ in the form of iron naphthenate is added to accelerate the corrosion. The test is carried out by heating 1500 cc. of the oil at 325° F. for 10 hours in an open container providing free circulation of air while portions of the oil are sprayed continuously against two freshly sanded alloy bearings. When silver-cadmium alloy bearings were used in the Underwood oxidation test using SAE 30 Mid-Continent base lubricating oil containing 0.01% $Fe_2O_3$ in the form of iron naphthenate without an antioxidant present, the loss in weight due to corrosion was 920 milligrams.

Ten grams of the product prepared in the manner described above were mixed with 50 cc. of SAE 30 Mid-Continent base lubricating oil. After adding 15.0 g. of $Ba(OH)_2 \cdot 8H_2O$, the mixture was heated at 100° C. for 1 hour with stirring. The neutralized oil was then filtered through glass wool to remove unreacted barium hydroxide. This concentrate was then blended with more SAE 30 oil and iron naphthenate such that the final oil contained 0.5% of the barium salt of the phosphorothiolothionate and 0.01% $Fe_2O_3$ in the form of iron naphthenate. When this oil composition was tested in the Underwood test, the loss in weight due to corrosion of the bearings was only 8 milligrams.

*Example 2*

2,2-dimethyl-1,3-propanediol (20.8 g., 0.2 mole) and $P_2S_5$ (11.1 g., 0.05 mole) were mixed and heated on the steam bath until the reaction mixture melted. Then it was heated on the steam bath with stirring for 1 hour. By this time, all of the $P_2S_5$ had reacted and the product was a transparent, viscous, colorless oil. The yield was 27.0 g. of products predominantly having the formula:

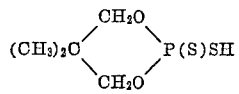

The neutral equivalent of this product was 240.5.

The barium salt was prepared according to the procedure described in Example 1. When tested in SAE 30 Mid-Continent base lubricating oil by the Underwood oxidation test at 1.0% concentration of the barium salt of this phosphorothiolothionate and 0.01% $Fe_2O_3$ (as iron naphthenate), the loss in weight due to corrosion of the bearings was 3 milligrams.

*Example 3*

Ethylene glycol (18.6 g., 0.3 mole) and $P_2S_5$ (22.2 g., 0.1 mole) were mixed and stirred without external heating for 30 minutes. The reaction was exothermic and the temperature rose to about 50° C. When the temperature started to fall, the reaction mixture was carefully heated on the steam bath with stirring for 1 hour. The product was a viscous, transparent, straw colored oil and amounted to 49.5 g. The neutral equivalent of this material was 286. The product predominantly has the formula:

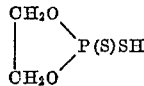

*Example 4*

2-butyl-2-ethyl-1,3-propanediol (32.0 g., 0.2 mole) and $P_2S_5$ (22.2 g., 0.1 mole) were reacted according to the procedure of Example 1 to produce a product predominantly having the formula:

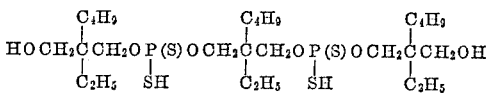

We claim:

1. A lubricating composition comprising a major proportion of lubricating oil and a minor proportion of a metal salt selected from the group consisting of alkali metal salts and alkaline earth metal salts of an organophosphorus compound having the formula:

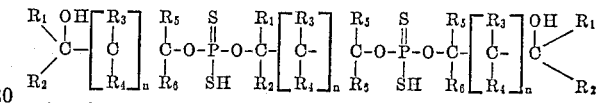

wherein $R_1$, $R_2$, $R_3$, $R_4$, $R_5$ and $R_6$ are selected from the group consisting of hydrogen and alkyl radicals containing from 1 to 4 carbon atoms, the total number of carbon atoms in $R_1$, $R_2$, $R_3$, $R_4$, $R_5$ and $R_6$ not exceeding 10 and wherein $n$ is a whole number not greater than 1.

2. A lubricating composition comprising a major proportion of lubricating oil and a minor proportion of a corrosion inhibitor consisting predominantly of a metal salt selected from the group consisting of alkali metal salts and alkaline earth metal salts of a compound having the formula:

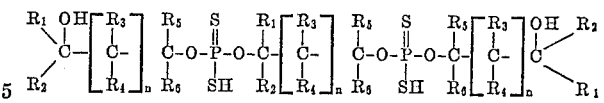

wherein $R_1$, $R_2$, $R_3$, $R_4$, $R_5$ and $R_6$ are selected from the group consisting of hydrogen and alkyl radicals containing from 1 to 4 carbon atoms, the total number of carbon atoms in $R_1$, $R_2$, $R_3$, $R_4$, $R_5$ and $R_6$ not exceeding 10 and wherein $n$ is a whole number not greater than 1.

References Cited in the file of this patent

UNITED STATES PATENTS

| | | |
|---|---|---|
| 2,355,106 | Prutton | Aug. 8, 1944 |
| 2,552,570 | McNab et al. | May 15, 1951 |
| 2,661,365 | Gamrath et al. | Dec. 1, 1954 |

FOREIGN PATENTS

| | | |
|---|---|---|
| 759,334 | Great Britain | Oct. 17, 1956 |

OTHER REFERENCES

Arbuzov et al.: Chemical Abstracts, 42, 4932–4934 (1948).